US012811256B2

(12) United States Patent
Oh

(10) Patent No.: US 12,811,256 B2
(45) Date of Patent: Nov. 24, 2026

(54) CYLINDRICAL BATTERY CELL HAVING CONNECTION MEMBER MOUNTED THERETO AND BATTERY MODULE INCLUDING THE SAME

(71) Applicant: LG ENERGY SOLUTION, LTD., Seoul (KR)

(72) Inventor: Sung Jin Oh, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 526 days.

(21) Appl. No.: 18/287,533

(22) PCT Filed: Nov. 29, 2022

(86) PCT No.: PCT/KR2022/019016
§ 371 (c)(1),
(2) Date: Oct. 19, 2023

(87) PCT Pub. No.: WO2023/101353
PCT Pub. Date: Jun. 8, 2023

(65) Prior Publication Data

US 2024/0387955 A1 Nov. 21, 2024

(30) Foreign Application Priority Data

Nov. 30, 2021 (KR) ........................ 10-2021-0168779

(51) Int. Cl.
*H01M 50/517* (2021.01)
*H01M 50/107* (2021.01)
(Continued)

(52) U.S. Cl.
CPC ....... *H01M 50/517* (2021.01); *H01M 50/107* (2021.01); *H01M 50/152* (2021.01);
(Continued)

(58) Field of Classification Search
None
See application file for complete search history.

(56) References Cited

U.S. PATENT DOCUMENTS 5,998,060 A 12/1999 McGrady
7,304,453 B2 * 12/2007 Eaves ................ H01M 10/425 320/120
(Continued)

FOREIGN PATENT DOCUMENTS

CN 104518380 A 4/2015
EP 3499602 A1 6/2019
(Continued)

OTHER PUBLICATIONS

Machine Translation of Japanese Patent Publication No. 2010-08411 (Year: 2010).*
(Continued)

*Primary Examiner* — Wyatt P Mcconnell
(74) *Attorney, Agent, or Firm* — Morgan, Lewis & Bockius LLP

(57) ABSTRACT

A cylindrical battery cell may include an electrode assembly having a structure in which a positive electrode sheet and a negative electrode sheet are wound in the state in which a separator is interposed therebetween, a battery case configured to receive the electrode assembly, and a cap assembly loaded on an upper end of the battery case. A connection member for series connection between cylindrical battery cells may be mounted to an upper part of the cap assembly, and an inwardly concave recessed portion may be formed in a bottom of the battery case. As a consequence, electrical connection between a plurality of cylindrical battery cells can be achieved using a simple method.

10 Claims, 5 Drawing Sheets

(51) Int. Cl.

| | |
|---|---|
| ***H01M 50/152*** | (2021.01) |
| ***H01M 50/213*** | (2021.01) |
| ***H01M 50/503*** | (2021.01) |
| ***H01M 50/51*** | (2021.01) |
| ***H01M 50/548*** | (2021.01) |

(52) U.S. Cl.
CPC ....... *H01M 50/213* (2021.01); *H01M 50/503* (2021.01); *H01M 50/51* (2021.01); *H01M 50/548* (2021.01)

(56) References Cited

U.S. PATENT DOCUMENTS

| | | | | |
|---|---|---|---|---|
| 10,700,337 | B2 * | 6/2020 | Wu ..................... | H01M 50/548 |
| 2007/0184342 | A1 | 8/2007 | Kawono et al. | |
| 2015/0099162 | A1 | 4/2015 | Wu | |
| 2020/0075919 | A1 | 3/2020 | Kim et al. | |
| 2021/0036279 | A1 | 2/2021 | Tada et al. | |

FOREIGN PATENT DOCUMENTS

| | | | |
|---|---|---|---|
| JP | S58-162567 | U | 10/1983 |
| JP | H08-222201 | A | 8/1996 |
| JP | 2002-231298 | A | 8/2002 |
| JP | 2006-277974 | A | 10/2006 |
| JP | 2006-313795 | A | 11/2006 |
| JP | 2009-188095 | A | 8/2009 |
| JP | 2010-080411 | A | 4/2010 |
| JP | 5015455 | B2 | 8/2012 |
| JP | 2019102123 | A | 6/2019 |
| JP | 2004-296354 | A | 7/2019 |
| JP | 4659079 | B2 | 7/2019 |
| KR | 2007-0103896 | A | 10/2007 |
| KR | 2012-0103991 | A | 9/2012 |
| KR | 10-1397859 | B1 | 5/2014 |
| KR | 2019-0075343 | A | 7/2019 |
| WO | 2014/068867 | A1 | 5/2014 |
| WO | 2019-150771 | A1 | 8/2019 |

OTHER PUBLICATIONS

Office Action dated Sep. 24, 2024 issued in Japanese Patent Application No. 2023-563830. (Note: JP2010-080411A and JPH08-222201A were cited in previous IDS').

The extended European search report issued in corresponding EP Patent Application No. 22901711.6, dated Apr. 29, 2025. (Note: JP 2010-080411 A was previously cited).

Office Action issued in corresponding Japanese Patent Application No. 2023-563830, dated Apr. 1, 2025. (Note: JP 2010-080411 A, JP H08-222201 A, JP 2006-277974 A, JP 2002-231298 A, JP S58-162567 U, U.S. Pat. No. 5,998,060 A were previously cited).

International Search Report (with partial translation) and Written Opinion dated Mar. 6, 2023, for corresponding International Patent Application No. PCT/KR2022/019016.

Office Action dated Jun. 24, 2026 issued in the corresponding Chinese Patent Application No. 202280021895.X. (Note: JP 2010080411 A, and EP 3499602 A1 already filed.).

* cited by examiner

【FIG. 1】
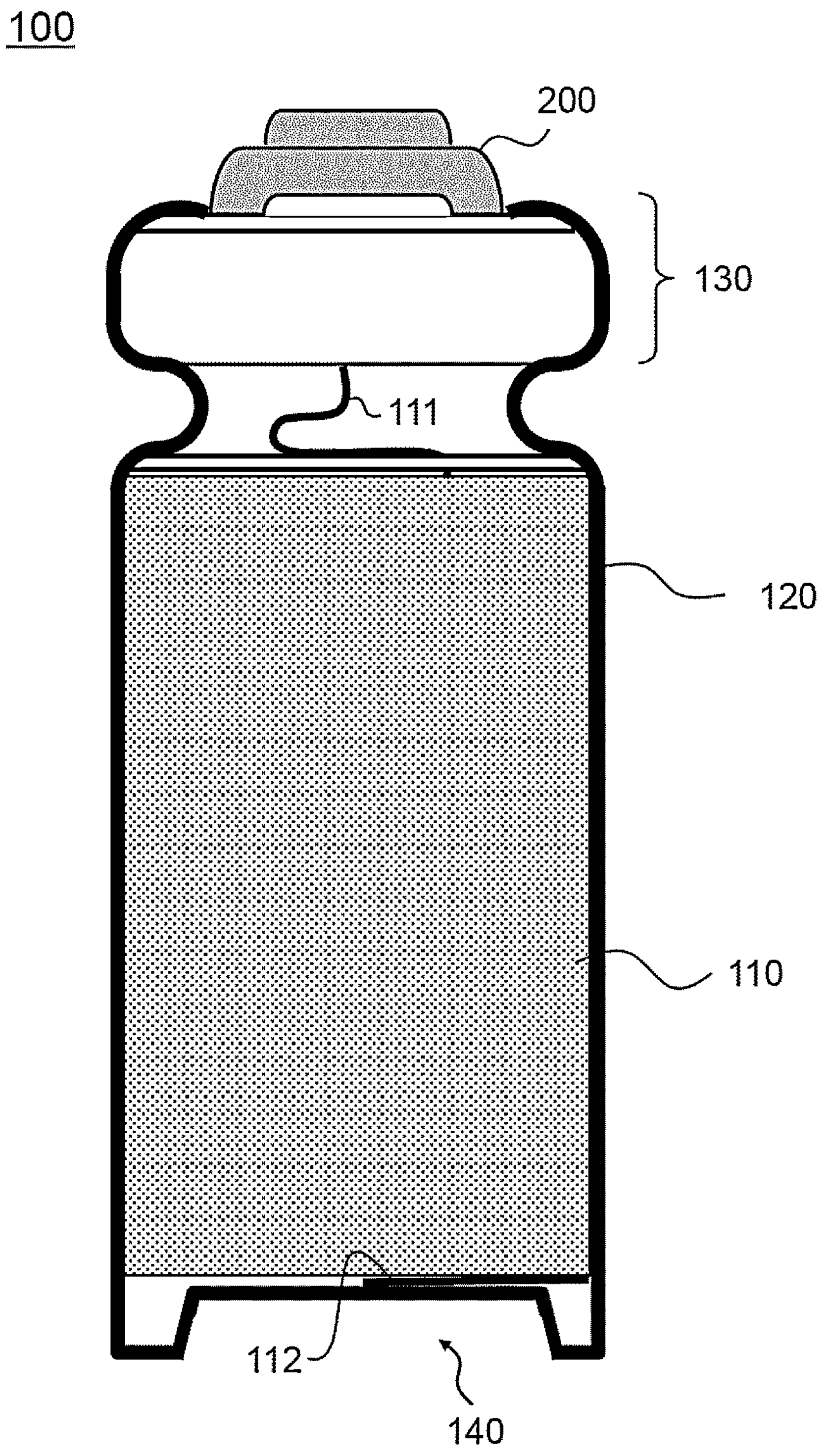

【FIG. 2】
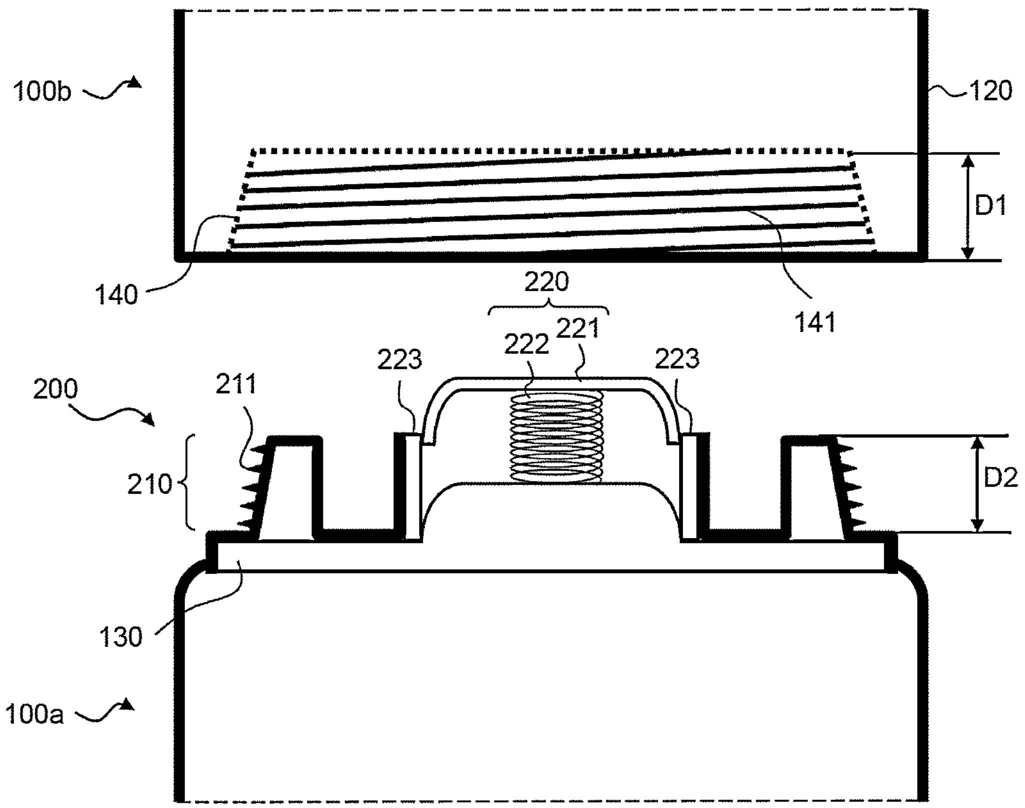

【FIG. 3】
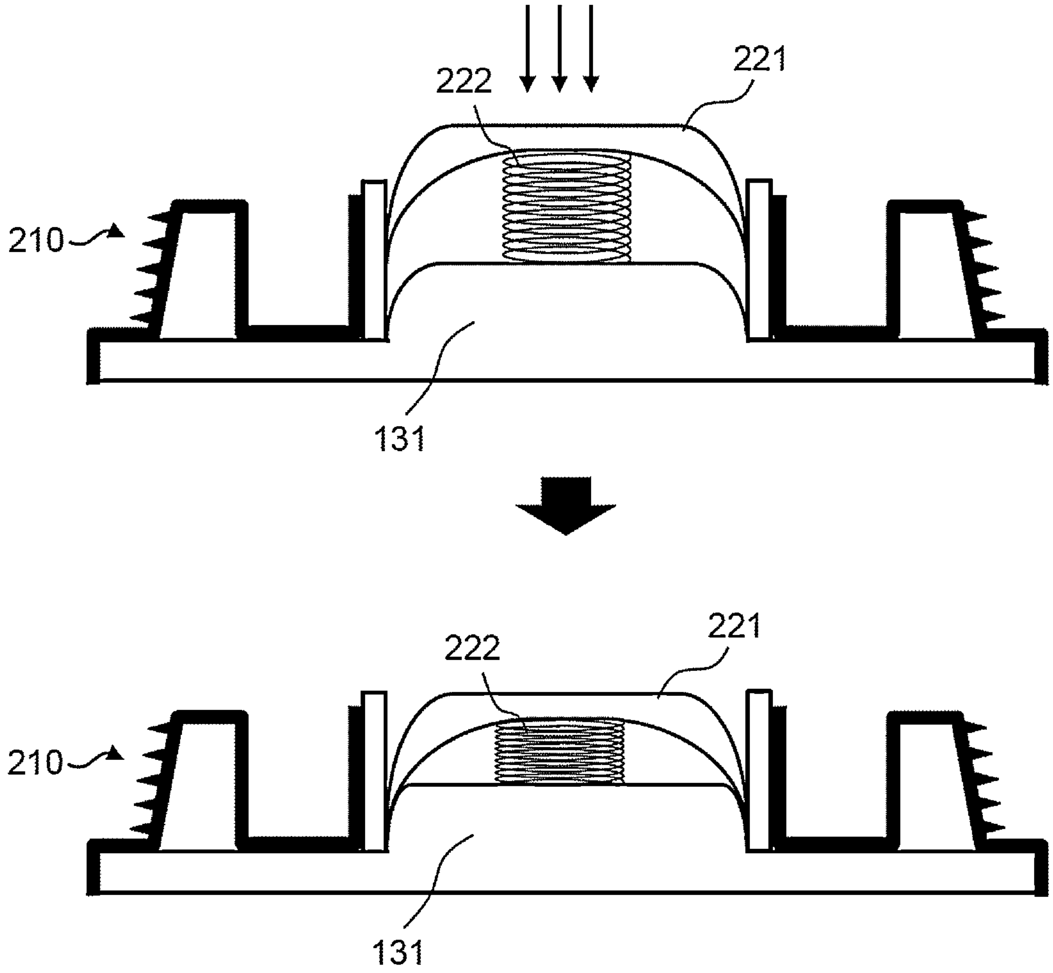

【FIG. 4】
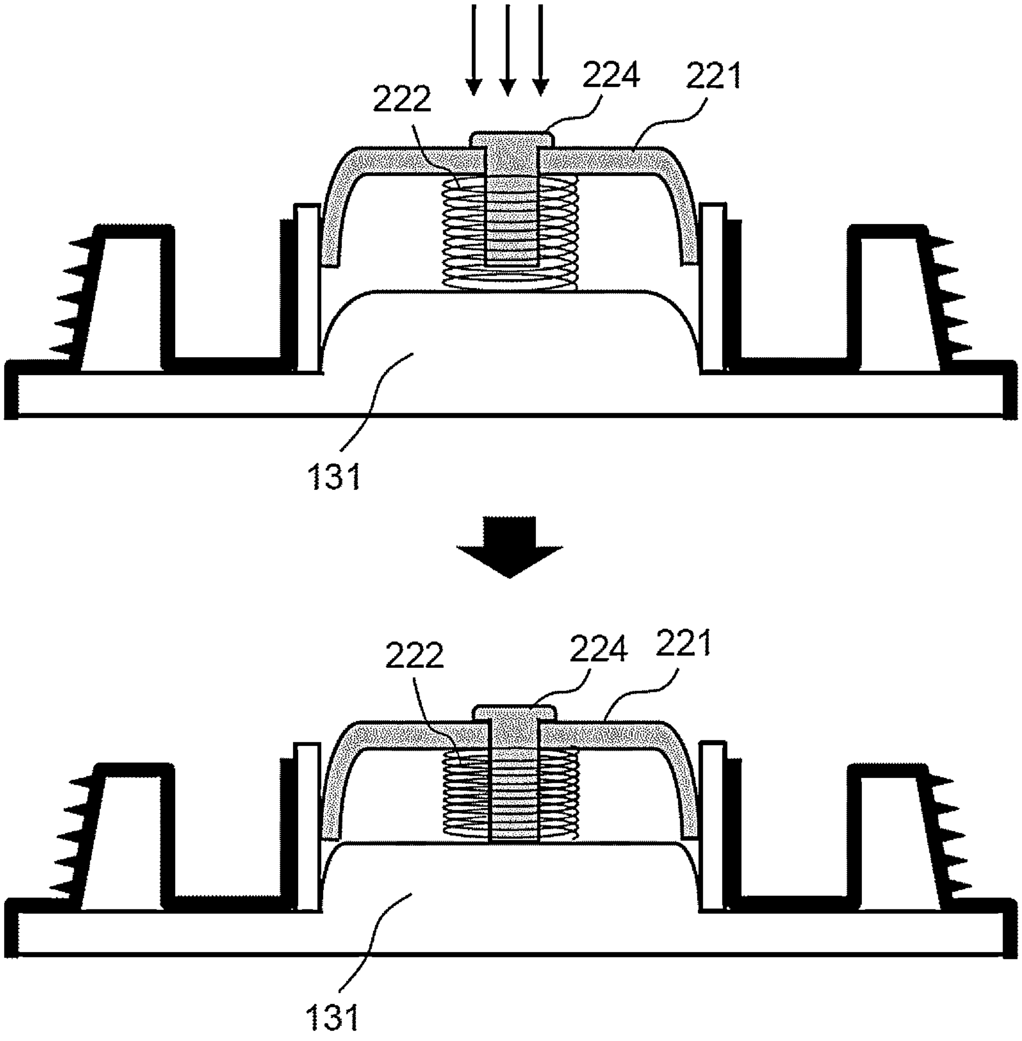

【FIG. 5】
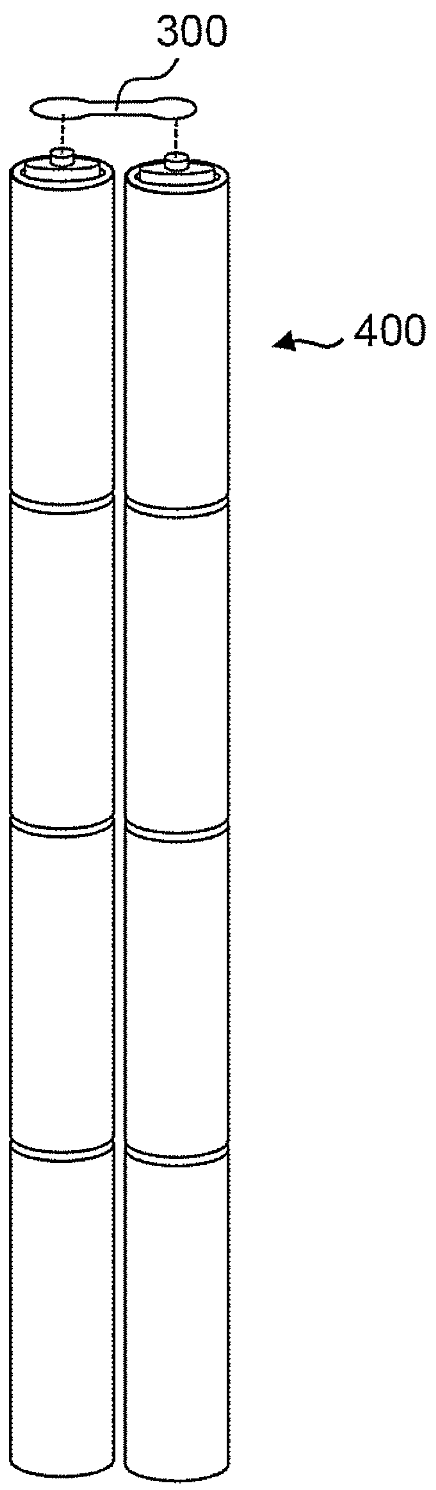

CYLINDRICAL BATTERY CELL HAVING CONNECTION MEMBER MOUNTED THERETO AND BATTERY MODULE INCLUDING THE SAME

TECHNICAL FIELD

This application claims the benefit of priority to Korean Patent Application No. 2021-0168779 filed on Nov. 30, 2021, the disclosure of which is incorporated herein by reference in its entirety.

The present invention relates to a cylindrical battery cell having a connection member mounted thereto and a battery module including the same. More particularly, the present invention relates to a cylindrical battery cell having a connection member, configured to allow cylindrical battery cells to be easily connected to each other in series therethrough, mounted thereto and a battery module including the same.

Background

As existing gasoline and diesel vehicles using fossil fuels are pointed out as an air pollution source, interest in an electrode vehicle, a hybrid electric vehicle, and a plug-in hybrid electric vehicle as alternatives thereto has increased, and research and development of a secondary battery as an energy source therefor has been actively conducted.

In addition, with high functionalization of portable electronic devices, demand for a high-capacity secondary battery has increased.

In order to increase the capacity and voltage of the secondary battery, however, a structure, such as a battery pack, is necessary. In order to constitute the battery pack, additional members, such as a battery pack case and an electrical connection member, are needed, and the weight thereof is also increased.

In addition, for a cylindrical secondary battery, standardized sizes are used, and therefore the degree of freedom in designing a battery cell in a device is low.

In connection therewith, Patent Document 1 discloses a battery having a terminal structure such that connection and separation between a plurality of cylindrical battery cells are easily performed and a battery connection method.

In Patent Document 1, a battery case is provided with a first terminal having a female screw portion formed therein and a second terminal having a male screw portion convexly formed thereon, and a first conductor portion of the first terminal and a second conductor portion of the second terminal function as a positive electrode and a negative electrode, respectively.

In Patent Document 1, however, a method of rotating a screw head of a fixing member using a tool, such as a wrench, is used to connect the cylindrical battery cells to each other in series. That is, a separate tool is necessary for electrical connection between the battery cells.

In Patent Document 2, which relates to a capacitor connection structure configured to electrically connect a plurality of capacitors to each other, a connector has a negative electrode fitting portion having an outer diameter equal to the outer diameter of a capacitor case, the negative electrode fitting portion being fitted onto a negative electrode, and a hollow positive electrode fitting portion fitted onto a positive electrode protrusion, wherein the negative electrode fitting portion is welded to the negative electrode of the capacitor and the positive electrode fitting portion is welded to the positive electrode protrusion of the capacitor.

In Patent Document 2, electrical connection between the capacitors is achieved using a separate connector independent of the capacitor, and a welding process is required for electrical connection.

In Patent Document 3, which relates to a battery connector configured to connect batteries to each other in series, the battery connector includes an upper fixing means having a fixing protrusion formed thereon and a lower fixing means including a fixing latch, and a first battery and a second battery are fastened to the fixing protrusion and the fixing latch of the battery connector, whereby the batteries are connected to each other.

When the connection method disclosed in Patent Document 3 is used, the battery cells are not stably fixed, and connection therebetween may be released.

Therefore, there is a need for technology capable of electrically connecting a plurality of battery cells to each other without a separate additional member or an addition process and stably maintaining the electrical connection state therebetween.

PRIOR ART DOCUMENTS (Patent Document 1) Japanese Patent Application Publication No. 2010-080411 (2010 Apr. 8)
(Patent Document 2) Japanese Patent Application Publication No. 2009-188095 (2009 Aug. 20)
(Patent Document 3) Korean Patent Application Publication No. 2019-0075343 (2019 Jul. 1)

DISCLOSURE

Technical Problem

The present invention has been made in view of the above problems, and it is an object of the present invention to provide a cylindrical battery cell having a connection member, configured to easily and simply connect a plurality of cylindrical battery cells to each other in series such that the electrical connection state therebetween is stably maintained, mounted thereto and a battery module including the same.

Technical Solution

A cylindrical battery cell according to the present invention to accomplish the above object includes an electrode assembly having a structure, a battery case configured to receive the electrode assembly, and a cap assembly loaded on an upper end of the battery case, wherein a connection member for series connection between cylindrical battery cells is mounted to an upper part of the cap assembly, and an inwardly concave recessed portion is formed in a bottom of the battery case. In an example, the electrode assembly may have the structure in which a positive electrode sheet and a negative electrode sheet are wound in the state in which a separator is interposed therebetween.

A recessed portion screw thread may be formed at a side wall of the inwardly concave recessed portion.

The connection member may include a coupling portion coupled to another battery cell and a pressure contact portion located at a central part of the coupling portion.

In addition, a coupling portion screw thread may be formed at a coupling surface of the coupling portion that is coupled to another battery cell.

The cylindrical battery cell may include a first battery cell and a second battery cell, and the first battery cell and the second battery cell may be coupled to each other using a screw fastening method of rotating the first battery cell and the second battery cell in opposite directions while inserting the coupling portion of the first battery cell into the inwardly concave recessed portion of the second battery cell.

The pressure contact portion may include a button portion protruding from an upper surface of the coupling portion, the button portion being configured to be inserted into the coupling portion when pressed, and an elastic member located under the button portion, the elastic being configured to be compressed by insertion of the button portion and to be restored when pressing of the button portion is released.

The button portion may include an electrical conduction portion made of an electrically conductive material, and the electrical conduction portion may be brought into contact with a top cap when the button portion is pressed.

The connection member may be coupled to an upper surface of the cap assembly such that the position of the connection member is fixed.

A positive electrode tab of the electrode assembly may be attached to a lower part of the cap assembly, and a negative electrode tab of the electrode assembly may be attached to an inner surface of the inwardly concave recessed portion.

The depth of the inwardly concave recessed portion may be equal to or less than the height of the coupling portion.

The present invention provides a battery module including two or more cylindrical battery cells, wherein a plurality of cylindrical battery cells is connected to each other in a longitudinal direction of a battery case to constitute a series line structure, a plurality of series line structures is disposed such that side surfaces of the battery cases are adjacent to each other, and the plurality of series line structures is coupled to each other in series or in parallel via a busbar. In an example, the plurality of cylindrical battery cells may include the cylindrical battery cell according to the present invention.

In addition, the present invention may provide various combinations of the above solving means.

Advantageous Effects

As is apparent from the above description, in a cylindrical battery cell having a connection member mounted thereto according to the present invention, it is possible to electrically connect a plurality of cylindrical battery cells to each other without a separate process, such as welding.

In addition, a concave recessed portion is formed in a bottom of a battery case and a coupling portion of another battery cell is inserted into and coupled to the recessed portion, and therefore the height of the connection member does not affect an increase in overall length of the cylindrical battery cells connected to each other in series.

In addition, when the cylindrical battery cells are rotated in opposite directions in a state of being engaged with each other, the distance therebetween is decreased, whereby a button portion is pressed, and therefore electrical connection therebetween is achieved. Consequently, electrical connection and separation may be achieved without a separate additional member.

BRIEF DESCRIPTION OF THE DRAWINGS

FIG. 1 is a vertical sectional view of a cylindrical battery cell according to the present invention.

FIG. 2 is a vertical sectional view showing a connection part between two cylindrical battery cells connected to each other in series.

FIG. 3 is a vertical sectional view of a connection member according to a first embodiment.

FIG. 4 is a vertical sectional view of a connection member according to a second embodiment.

FIG. 5 is a perspective view showing the state in which series line structures, constituted by cylindrical battery cells according to the present invention connected to each other, are connected to each other via a busbar.

MODES OF PRACTICE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Embodiments of the present invention will be described in detail with reference to the accompanying drawings.

FIG. 1 is a vertical sectional view of a cylindrical battery cell according to the present invention.

Referring to FIG. 1, the cylindrical battery cell 100 according to the present invention includes an electrode assembly 110 having a structure in which a positive electrode sheet and a negative electrode sheet are wound in the state in which a separator is interposed therebetween, a battery case 120 configured to receive the electrode assembly 110, and a cap assembly 130 loaded on an upper end of the battery case 120, wherein a connection member 200 for series connection between cylindrical battery cells 100 is mounted to an upper part of the cap assembly 130 and an inwardly concave recessed portion 140 is formed in a bottom of the battery case 120.

In the present invention, as described above, the connection member 200 is mounted to an upper part of the cylindrical battery cell 100 and the recessed portion 140 is formed in the bottom of the battery case 120. For series connection between two different cylindrical battery cells, e.g. a first battery cell and a second battery cell, therefore, a method of coupling the connection member mounted to an upper end of the first battery cell to the recessed portion of the second battery cell may be used.

The connection member 200 is coupled to the cap assembly 130, and the connection member 200 and the cap assembly 130 may be integrally formed. Consequently, an additional separate member for series connection between the cylindrical battery cells, to each of which the connection member is mounted, as in the present invention, is unnecessary.

A positive electrode tab 111 of the electrode assembly 110 is attached to a lower part of the cap assembly 130, and a negative electrode tab 112 of the electrode assembly 110 is attached to an inner surface of the recessed portion 140.

The cap assembly 130, to which the positive electrode tab 111 is connected, as described above, is coupled to the connection member 200, whereby the connection member 200 functions as a positive electrode terminal. The negative electrode tab 112 is attached to the inner surface of the recessed portion 140, whereby the recessed portion 140 functions as a negative electrode terminal.

Consequently, different cylindrical battery cells may be connected to each other via the connection member 200, whereby series connection may be achieved.

FIG. 2 is a vertical sectional view showing a connection part between two cylindrical battery cells connected to each other in series.

Referring to FIG. 2, a recessed portion screw thread 141 is formed at a side wall of the recessed portion 140.

The connection member 200 includes a coupling portion 210 coupled to another battery cell and a pressure contact portion 220 located at a central part of the coupling portion 210.

In addition, a coupling portion screw thread 211 is formed at a coupling surface of the coupling portion 210 that is coupled to another battery cell.

Specifically, when the first battery cell 100*a* is located at the rear end and the second battery cell 100*b* is located at the front end, coupling therebetween is achieved using a screw fastening method of rotating the first battery cell 100*a* and the second battery cell 100*b* in opposite directions while inserting the coupling portion 210 of the first battery cell 100*a* into the recessed portion 140 of the second battery cell 100*b*. When the first battery cell 100*a* and the second battery cell 100*b* are rotated in opposite directions, as described above, the distance between the coupling portion 210 of the first battery cell 100*a* and the recessed portion 140 of the second battery cell 100*b* is decreased, and the coupling portion screw thread 211 of the coupling portion 210 of the first battery cell 100*a* is completely coupled to the recessed portion screw thread 141 of the recessed portion 140 of the second battery cell 100*b* in tight contact therewith.

In order to prevent the connection member 200 from being rotated in the same direction as the second battery cell 100*b* when the first battery cell 100*a* and the second battery cell 100*b* are rotated in opposite directions, as described above, the connection member 200 may be coupled to an upper surface of the cap assembly 130 such that the position of the connection member is fixed.

For example, a lower part of the connection member 200 may be formed so as to wrap the upper surface and an outer periphery of the cap assembly 130, and an adhesive material may be added to or a weld portion may be formed at the parts of the connection member 200 and the cap assembly 130 that are brought into tight contact with each other in order to fix the connection member 200.

The pressure contact portion 220 includes a button portion 221 protruding from an upper surface of the coupling portion 210, the button portion being configured to be inserted into the coupling portion 210 when pressed, and an elastic member 222 located under the button portion 221, the elastic member being configured to be compressed by pressing of the button portion 221 and to be restored when pressing of the button portion 221 is released.

Specifically, when the second battery cell 100*b* presses the button portion 221 while being coupled to the first battery cell 100*a*, the button portion 221 is moved downwards while the elastic member 222 is compressed, whereby electrical connection with the top cap may be achieved.

A support portion 223 is located at an outer periphery of the button portion 221. The second battery cell 100*b* may be moved downwards to an upper surface of the support portion 223, and the button portion 221 is pressed until an upper surface of the button portion 221 reaches the same plane as the upper surface of the support portion 223.

Meanwhile, in consideration of the fact that the recessed portion screw thread 141 of the recessed portion 140 and the coupling portion screw thread 211 of the coupling portion 210 are coupled to each other in the recessed portion 140 and the recessed portion 140 presses the button portion 221, the depth D1 of the recessed portion may be equal to or less than the height D2 of the coupling portion 210.

In order to minimize the distance between the first battery cell and the second battery cell when the recessed portion and the coupling portion are coupled to each other, however, the depth D1 of the recessed portion may be equal to the height D2 of the coupling portion.

For example, a spring, rubber, or latex may be used as the elastic member 222.

FIG. 3 is a vertical sectional view of a connection member according to a first embodiment.

Referring to FIG. 3, the upper figure shows the state before the connection member is pressed, and the lower figure shows the state in which the connection member is pressed.

When the connection member is coupled to the recessed portion of the battery cell located above the connection member, the button portion 221 is pressed as the distance between the connection member and the battery cell located thereabove is decreased. As a result, the elastic member 222 is compressed, and the button portion 221 is moved downwards, whereby the outer periphery of the button portion 221 is brought into contact with the top cap 131.

As the top cap 131 and the button portion 221 are brought into contact with each other, as described above, the button portion 221 functions as a positive electrode terminal, and the button portion is coupled to the recessed portion, which functions as a negative electrode terminal, of the battery cell located thereabove, whereby series connection may be achieved.

FIG. 4 is a vertical sectional view of a connection member according to a second embodiment.

Referring to FIG. 4, the upper figure shows the state before the connection member is pressed, and the lower figure shows the state in which the connection member is pressed.

In the connection member according to the second embodiment, an electrical conduction portion 224 made of an electrically conductive material is disposed at the center of the button portion 221.

When the connection member is coupled to the recessed portion of the battery cell located above the connection member, the button portion 221 is pressed as the distance between the connection member and the battery cell located thereabove is decreased. As a result, the elastic member 222 is compressed, and the button portion 221 is moved downwards, whereby the electrical conduction portion 224 is brought into contact with the top cap 131.

As the electrical conduction portion 224 and the top cap 131 are brought into contact with each other, as described above, the button portion 221 functions as a positive electrode terminal, and the button portion is coupled to the negative electrode terminal of the battery cell located thereabove, whereby series connection may be achieved.

A connector configured to form electrical connection when pressed, such as a LEENO pin or a pogo pin, may be used as the connection member according to the present invention.

FIG. 5 is a perspective view showing the state in which series line structures, constituted by cylindrical battery cells according to the present invention connected to each other, are connected to each other via a busbar.

Referring to FIG. 5, four battery cells are connected to each other in series via connection members in a longitudinal direction of the battery case to constitute a series line structure 400, and two series line structures 400 are connected to each other in parallel via a busbar 300 in a state of being disposed such that side surfaces of the battery cases are adjacent to each other.

Unlike what is shown in FIG. 5, the plurality of series line structures may be connected to each other in series.

When the cylindrical battery cell according to the present invention is configured, as described above, it is possible to achieve electrical connection between a plurality of battery cells using a simple method.

Those skilled in the art to which the present invention pertains will appreciate that various applications and modifications are possible within the category of the present invention based on the above description.

DESCRIPTION OF REFERENCE NUMERALS

100: Cylindrical battery cell
100*a*: First battery cell
100*b*: Second battery cell
110: Electrode assembly
111: Positive electrode tab
112: Negative electrode tab
120: Battery case
130: Cap assembly
131: Top cap
140: Recessed portion
141: Recessed portion screw thread
200: Connection member
210: Coupling portion
211: Coupling portion screw thread
220: Pressure contact portion
221: button portion
222: Elastic member
223: Support portion
224: Electrical conduction portion
300: Busbar
400: Series line structure
D1: Depth of recessed portion
D2: Height of coupling portion

The invention claimed is:

1. A cylindrical battery cell, comprising:
an electrode assembly having a structure;
a battery case configured to receive the electrode assembly; and
a cap assembly loaded on an upper end of the battery case,
wherein:
a connection member for series connection between cylindrical battery cells is mounted to an upper part of the cap assembly;
the connection member comprises: a coupling portion for being coupled to another battery cell; and a pressure contact portion located at a central part of the coupling portion;
the pressure contact portion comprises: a button portion and an elastic member;
the button portion is located above the elastic member;
the button portion protrudes upward from an upper surface of the coupling portion when not pressed;
the button portion is inserted into the coupling portion when pressed; and
an inwardly concave recessed portion is formed in a bottom of the battery case.

2. The cylindrical battery cell according to claim 1, wherein a recessed portion screw thread is formed at a side wall of the inwardly concave recessed portion.

3. The cylindrical battery cell according to claim 1, wherein a coupling portion screw thread is formed at a coupling surface of the coupling portion that is coupled to another battery cell.

4. The cylindrical battery cell according to claim 3, wherein
the cylindrical battery cell comprises a first battery cell and a second battery cell,
the first battery cell and the second battery cell are coupled to each other using a screw fastening method of rotating the first battery cell and the second battery cell in opposite directions while inserting the coupling portion of the first battery cell into an inwardly concave recessed portion of the second battery cell, and
the second battery cell is the another battery cell.

5. The cylindrical battery cell according to claim 1,
wherein the elastic member is configured to be compressed by insertion of the button portion and to be restored when pressing of the button portion is released.

6. The cylindrical battery cell according to claim 5, wherein
the button portion comprises an electrical conduction portion made of an electrically conductive material, and
the electrical conduction portion is brought into contact with a top cap when the button portion is pressed.

7. The cylindrical battery cell according to claim 1, wherein the connection member is coupled to an upper surface of the cap assembly such that a position of the connection member is fixed.

8. The cylindrical battery cell according to claim 1, wherein
a positive electrode tab of the electrode assembly is attached to a lower part of the cap assembly, and
a negative electrode tab of the electrode assembly is attached to an inner surface of the inwardly concave recessed portion.

9. The cylindrical battery cell according to claim 1, wherein a depth of the inwardly concave recessed portion is equal to or less than a height of the coupling portion.

10. A battery module comprising two or more cylindrical battery cells, wherein
a plurality of cylindrical battery cells is connected to each other in a longitudinal direction of a battery case to constitute a series line structure,
the plurality of cylindrical battery cells comprise the cylindrical battery cell according to claim 1, a plurality of series line structures is disposed such that side surfaces of battery cases are adjacent to each other, and the plurality of series line structures is coupled to each other in series or in parallel via a busbar.

* * * * *